(12) United States Patent
Kim et al.

(10) Patent No.: US 7,065,700 B2
(45) Date of Patent: Jun. 20, 2006

(54) ENCODING APPARATUS AND METHOD IN CDMA COMMUNICATION SYSTEM

(75) Inventors: Jae-Yoel Kim, Kunpo-shi (KR); Hyun-Woo Lee, Suwon-shi (KR); Soon-Young Yoon, Seoul (KR); Hee-Won Kang, Seoul (KR); Ho-Kyu Choi, Seoul (KR)

(73) Assignee: Samsung Electronics Co., LTD (KR)

( * ) Notice: Subject to any disclaimer, the term of this patent is extended or adjusted under 35 U.S.C. 154(b) by 369 days.

(21) Appl. No.: 09/814,311

(22) Filed: Mar. 21, 2001

(65) Prior Publication Data

US 2002/0010893 A1    Jan. 24, 2002

(30) Foreign Application Priority Data

Mar. 21, 2000  (KR)  ................ 2000-14355
Jul. 5, 2000   (KR)  ................ 2000-38399

(51) Int. Cl.
   *H03M 13/03* (2006.01)
(52) U.S. Cl. ..................................... 714/790
(58) Field of Classification Search ............. 714/790, 714/701, 774, 776, 777, 779, 806; 370/203, 370/208, 209, 320, 335, 342, 441
   See application file for complete search history.

(56) References Cited

U.S. PATENT DOCUMENTS

| | | | | |
|---|---|---|---|---|
| 5,657,325 | A * | 8/1997 | Lou et al. ................ | 370/334 |
| 5,691,992 | A * | 11/1997 | Molnar et al. ............ | 714/752 |
| 6,170,076 | B1 * | 1/2001 | Kim ......................... | 714/786 |
| 6,385,752 | B1 * | 5/2002 | Li ............................ | 714/790 |
| 6,460,159 | B1 * | 10/2002 | Kim et al. ................ | 714/790 |
| 6,587,446 | B1 * | 7/2003 | Sarkar et al. ............. | 370/331 |
| 6,604,216 | B1 * | 8/2003 | Javerbring et al. ...... | 714/751 |
| 6,614,850 | B1 * | 9/2003 | Razoumov et al. ...... | 375/259 |
| 6,621,873 | B1 * | 9/2003 | Kim et al. ................ | 375/295 |
| 6,671,851 | B1 * | 12/2003 | Moulsley .................. | 714/790 |

(Continued)

FOREIGN PATENT DOCUMENTS

WO    WO 97/40593    10/1997

(Continued)

OTHER PUBLICATIONS

"An Updated Table of Minimum-Distance Bounds for Binary Linear Codes", A.E.Brouwer and T IEEE Transactions on Information Theory, vol. 39, No. 2, pp. 662-667, Mar. 1993.

(Continued)

*Primary Examiner*—Albert Decady
*Assistant Examiner*—Cynthia Britt
(74) *Attorney, Agent, or Firm*—Dilworth & Barrese LLP

(57) ABSTRACT

There is provided an encoding apparatus and method in a CDMA communication system. To encode input information of a k-bit sequence and generate a codeword with length $N>(2^k-1)$, an encoder encodes the input information using an (r, k) simplex code and generates a sequence of code symbols of length r ($r=2^k-1$), a repeater repeats the sequence of code symbols t times $$\left(t=\left\lfloor\frac{N}{r}\right\rfloor+1\right),$$

and a puncturer performs puncturing A times (A=rt−N) on the t repeated code symbol sequences so that the resulting codes have length N. The punctured symbols are distributed uniformly across the repeated code symbol sequences or confined to the $t^{th}$ repeated code symbol sequence.

18 Claims, 5 Drawing Sheets

U.S. PATENT DOCUMENTS

| | | | |
|---|---|---|---|
| 6,732,316 B1* | 5/2004 | Tong et al. | 714/756 |
| 2002/0003813 A1* | 1/2002 | Marko | 370/477 |
| 2003/0012372 A1 | 1/2003 | Cheng | |

FOREIGN PATENT DOCUMENTS

| | | |
|---|---|---|
| WO | WO 99/48227 | 9/1999 |

OTHER PUBLICATIONS

European Search Report dated Apr. 15, 2003, issued in a counterpart application, namely, Appln. No. 01917887.0.

3GPP: 3rd Generation Partnership Project; Technical Specification Group Radio Access Network: Multiplexing and Channel Coding, Dec. 1999, pp. 1-52.

F.J. MacWilliams et al., The Theory of Error-Correcting Codes, Chapter 1, pp. 6-15.

3rd Generation Partnership Project: Technical Specification Group Group Radio Access Network; Multiplexing and Channel Coding (FDD), Dec. 1999, pp. 39-43.

CDMA Systems and Next-Generation Mobile Communication Systems, Jun. 1, 1996.

Calderbank, "The Art of Signaling: Fifty Years of Coding Theory", IEEE Transactions on Information Theory, vol. 44, No. 6, Oct. 1998, pp. 2561-2562.

Jones, "Using Simplex Codes to Improve OTDR Sensitivity", IEEE Photonics Technology Letters, vol. 15, No. 7, Jul. 1993, pp. 822-824.

Song et al., "Some New Construction for Simplex Codes", IEEE Transactions of Information Theory, vol. 40, No. 2, Mar. 1994, pp. 504-507.

* cited by examiner

ENCODING APPARATUS AND METHOD IN CDMA COMMUNICATION SYSTEM

PRIORITY

This application claims priority to an application entitled "Apparatus and Method for Encoding/Decoding Reverse Rate Indicator Information in a CDMA Communication System" filed in the Korean Industrial Property Office on Mar. 21, 2000 and assigned Serial No. 2000-14355, and to an application entitled "Apparatus and Method for Encoding/Decoding Reverse Rate Indicator Information in a Communication System" filed in the Korean Industrial Property Office on Jul. 5, 2000 and assigned Serial No. 2000-38399, the contents of both of which are hereby incorporated by reference.

BACKGROUND OF THE INVENTION

1. Field of the Invention

The present invention relates generally to an encoding apparatus and method in a communication system, and in particular, to an encoding apparatus and method in a CDMA communication system.

2. Description of the Related Art

Research has actively been made on high-rate transmission of frames in a CDMA (Code Division Multiple Access) mobile communication system. A system smith a channel structure for high-rate frame transmission is called an HDR (High Data Rate) system.

The HDR system transmits data frames at a fixed data rate or at a variable data rate. Since a data rate may be changed in variable rate services, the structure of frames (code rate, code repetition, etc.) determined by the transmission rate should be known to a receiver.

A so-called "RRI (Reverse Rate Indicator)" provides the structure of a frame currently being transmitted when frames are transmitted at different rates. Services at different rates are reliably provided by the RRI. An example RRI use is illustrated in FIG. 1.

FIG. 1 is a block diagram of a transmitter for a mobile station in a conventional CDMA system. It is assumed herein that the CDMA system is an HDR system, one transmission frame has 16 slots and 16 code symbols are transmitted in one slot (i.e., 256 code symbols are transmitted in one frame for transmission of an RRI).

Referring to FIG. 1, an encoder 100 encodes RRI information bits. For the input of three RRI bits, the encoder 100 outputs eight code symbols in 0s or 1s through (8, 3) orthogonal coding. A repeater 110 repeats the code symbols 32 times (each code symbol occurs 32 consecutive times) and outputs a total of 256 symbols (=32×8). A signal mapper 120 converts 0s and 1s to 1s and −1s, respectively. A multiplier 135 spreads the converted symbols by the converted chips (+1, +1, +1, +1) of Walsh code #0 of length 4 through multiplication and outputs the spread symbols in chip units. A multiplexer (MUX) 140 time-multiplexes the chip-basis symbols with other signals 1 and 2. The signals 1 and 2 can be DRC (Data Rate Control) information. An output signal I' of the multiplexer 140 and a data signal Q' are applied to the input of a complex spreader 150. The complex spreader 150 complex-multiplies the signals I' and Q' by PN spreading codes PNI and PNQ. That is, the complex spreader 150 multiplies an input signal (I'+jQ') by a PN spreading code (PNI+jPNQ) and outputs a real component signal I and an imaginary component signal Q. Baseband filters 160 and 165 perform baseband filtering on the real component signal I and the imaginary component signal Q, respectively. Multipliers 170 and 175 multiply the real component signal I and the imaginary component signal Q received from the baseband filters 160 and 165 by carriers cos (2πfct) and sin (2πfct), respectively. A summer 180 sums the multiplication results and outputs the sum as a transmission signal.

FIG. 2 is a block diagram of a receiver which is the counterpart of the transmitter of FIG. 1 for a base station in the HDR CDMA system. It is assumed that a frame transmitted from the transmitter has 16 slots and 16 code symbols are transmitted for transmission of an RRI in one slot (i.e., 256 code symbols are transmitted in one frame).

Referring to FIG. 2, multipliers 270 and 275 multiply an input signal by cos (2πfct) and sin (2πfct), respectively. Matching filters 260 and 265 filter the multiplication results of the multipliers 270 and 275 and output matching-filtered signals I and Q. A complex despreader 250 despreads the signals I and Q to signals I' and Q'. A demultiplexer 240 time-demultiplexes the signal I' into other signals 1 and 2 and a signal for an RRI. An accumulator 235 accumulates the RRI signal on a 4-chip basis and outputs 256 symbols. A symbol accumulator 210 receives the accumulated symbols. The symbol accumulator 210 is the counterpart of the repeater 110 shown in FIG. 1. A decoder 200, the counterpart of the encoder 100 of FIG. 1, decodes eight symbols received from the symbol accumulator 210 and outputs RRI information bits. If the encoder 100 is an (8, 3) orthogonal encoder, the decoder 200 can calculate an inverse fast Hadamard transform.

Eight RRI values exist for a three-bit RRI. The RRI is essential information to interpretation of service frames in a receiver. Therefore, if a transmission error occurs, the receiver cannot interpret the service frames reliably. To allow the receiver to correct the transmission error in the RRI, the RRI is usually error correction coded.

FIG. 3 illustrates a conventional encoding apparatus for the encoder 100 in the HDR system shown in FIG. 1. Three-bit RRI values versus their codewords after error correction coding are shown in FIG. 3. For example, the encoder 100 can be a memory for storing a series of RRI values and their codewords after error correction coding.

As shown in FIG. 3, the RRI values from 0 to 7 are expressed in three binary bits ranging from 000 to 111. An (8, 3) orthogonal encoder 300 outputs an eight-symbol RRI codeword for the input of an RRI value. That is, a three-bit RRI value is input to the encoder 100 and a code of length 8 is selected from a memory (or another storage) according to the input RRI value. A minimum distance between codes is 4 in the orthogonal encoder 300. After the code symbols are repeated 31 times (each code symbol occurs 32 consecutive times) in the repeater 110 of FIG. 1, the minimum distance is 128 (=4×32) from the viewpoint of a (256, 3) code.

The error correction capability of binary linear codes is determined by the minimum distance between linear codes. For details of a minimum distance between binary linear codes as optimum codes, see "An Updated Table of Minimum-Distance Bounds for Binary Linear Codes", A. E. Brouwer and Tom Verhoeff, IEEE Transactions on Information Theory, Vol. 39, No. 2, March 1993.

If input information (e.g., an RRI value) is three bits and an output codeword is 256 bits, the minimum distance between codes required for optimum codes is 146 according to the above document. However, since the minimum distance between codes in the conventional encoding apparatus is 128, no optimum codes exist for error correction coding.

Thus, the probability of the transmission information having errors is great in the same channel environment. In addition, if data frames are decoded based on a wrong data rate due to errors in the transmission information, the error rate of the data frames will increase. Therefore, it is important to minimize an error rate in an error correction encoder.

SUMMARY OF THE INVENTION

It is, therefore, an object of the present invention to provide an apparatus and method for encoding/decoding information (e.g., RRI) in an HDR CDMA communication system.

It is another object of the present invention to provide an encoding/decoding apparatus and method that can reduce the error rate of transmission information (e.g., RRI) in the same channel environment in an HDR CDMA communication system.

It is a further object of the present invention to provide an encoding/decoding apparatus and method that enable accurate determination of a variable data rate of data frames in an HDR CDMA communication system.

The foregoing and other objects are achieved by providing an apparatus for encoding input information of a k-bit sequence and generating a codeword with length $N>(2^k-1)$. An encoder encodes the input information using an (r, k) simplex code and generates a sequence of code symbols of length r ($r=2^k-1$). A repeater repeats the sequence of code symbols t times $$\left(t = \left\lfloor \frac{N}{r} \right\rfloor + 1\right),$$

and a puncturer performs puncturing A times on the t repeated code symbol sequences so that the resulting codes have length N (A=rt−N). The punctured symbols are distributed uniformly across the repeated code symbol sequences or confined to the $t^{th}$ repeated code symbol sequence.

BRIEF DESCRIPTION OF THE DRAWINGS

The above and other objects, features and advantages of the present invention will become more apparent from the following detailed description when taken in conjunction With the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since the, would obscure the invention in unnecessary detail.

Figure 3:
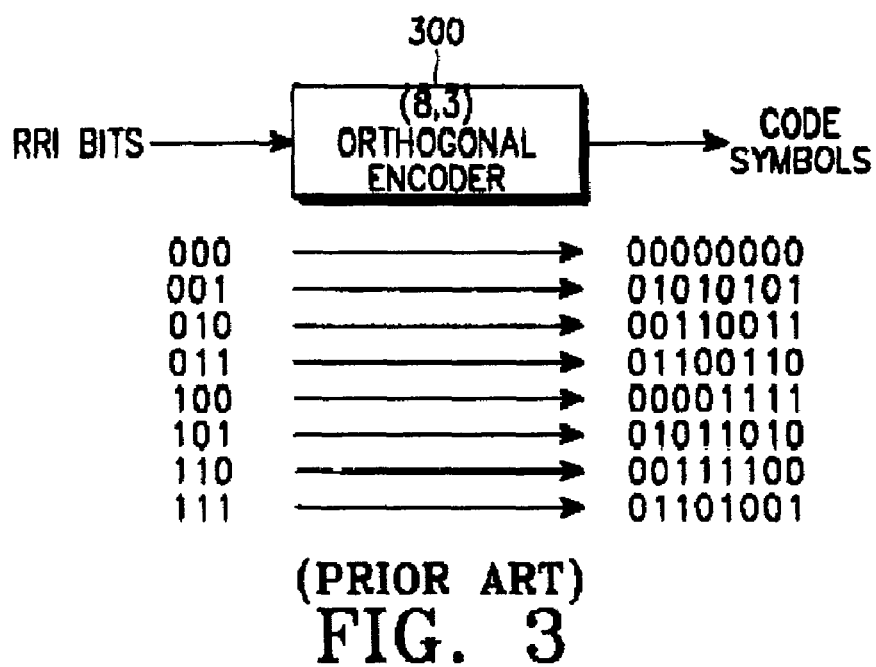
FIG. 3 is a view illustrating a relationship between an RRI and code symbols in a conventional (8, 3) orthogonal encoder.

The present invention generates optimum codes for encoding transmission information in a CDMA system, especially for encoding RRI information bits that indicate a frame structure in an HDR system. In the present invention, punctured (7, 3) orthogonal codes are used instead of the (8, 3) orthogonal codes of FIG. 3.

For better understanding of the subject matter of the present invention, the relationship between error correction codes and error correction performance will be described below. The performance of linear error correction codes is measured by the Hamming distance distribution of their codewords. Hamming distance refers to the number of non-zero symbols in a codeword. For a codeword "0111", the number of 1s in the codeword, namely, the Hamming distance of the codeword is 3. The smallest of Hamming distances is called a minimum distance. It is well known that as the minimum distance increases, the error correction performance of the linear error correction codes becomes excellent, as disclosed in "The Theory of Error-Correcting Codes", F. J. Macwilliams, N. J. A. Sloane, North-Holland.

First, a description will be made of Hamming distances and minimum distances for the conventional (8, 3) orthogonal codes and punctured (7, 3) orthogonal codes according to the present invention. The relationship among input bits, codewords, and Hamming distances for the (8, 3) orthogonal codes is illustrated in Table 1.

TABLE 1

| input bits | codeword | Hamming distance |
| --- | --- | --- |
| 000 | 00000000 | 0 |
| 001 | 01010101 | 4 |
| 010 | 00110011 | 4 |
| 011 | 01100110 | 4 |
| 100 | 00001111 | 4 |
| 101 | 01011010 | 4 |
| 110 | 00111100 | 4 |
| 111 | 01101001 | 4 |

As noted from Table 1, all codewords have 0s in their first columns, which has no influence on their Hamming distances. Therefore, although the (8, 3) codes are repeated 32 times (the (8, 3) codes occur 32 consecutive times), the repeated 32 symbols of the first column exert no influence on Hamming distances. Consequently, an optimum Hamming distance cannot be obtained.

On the other hand, codes with an optimum Hamming distance can be achieved by repeating (7, 3) codes 32 times, which are produced by puncturing the first columns of the (8, 3) codewords. Table 2 shows the relationship among input bits, codewords, and their Hamming distances for the punctured (7, 3) codes.

TABLE 2

| input bits | codeword | Hamming distance |
| --- | --- | --- |
| 000 | 0000000 | 0 |
| 001 | 1010101 | 4 |
| 010 | 0110011 | 4 |

TABLE 2-continued

| input bits | codeword | Hamming distance |
|---|---|---|
| 011 | 1100110 | 4 |
| 100 | 0001111 | 4 |
| 101 | 1011010 | 4 |
| 110 | 0111100 | 4 |
| 111 | 1101001 | 4 |

Now, codewords of length 32 will be focused on to compare the prior art with the present invention. For reference, an optimum minimum distance is 18 for (32, 3) codes in theory. After (8, 3) codes are repeated 4 times (the (8, 3) codes occur 4 consecutive times), the resulting codewords of length 32 are shown as follows.

TABLE 3

| Input Bits | Codeword | | | | Hamming Distance |
|---|---|---|---|---|---|
| 000 | 00000000 | 00000000 | 00000000 | 00000000 | 0 |
| 001 | 01010101 | 01010101 | 01010101 | 01010101 | 4 × 4 = 16 |
| 010 | 00110011 | 00110011 | 00110011 | 00110011 | 4 × 4 = 16 |
| 011 | 01100110 | 01100110 | 01100110 | 01100110 | 4 × 4 = 16 |
| 100 | 00001111 | 00001111 | 00001111 | 00001111 | 4 × 4 = 16 |
| 101 | 01011010 | 01011010 | 01011010 | 01011010 | 4 × 4 = 16 |
| 110 | 00111100 | 00111100 | 00111100 | 00111100 | 4 × 4 = 16 |
| 111 | 01101001 | 01101001 | 01101001 | 01101001 | 4 × 4 = 16 |

It is noted from Table 3 that the columns with bold 0s (i.e., the first columns of the repeated codewords) occur four consecutive times without influencing the Hamming distances of the codewords after repetition of the (8, 3) orthogonal codes. Therefore, the minimum distance is 16, not optimum.

The all-0s first columns of the (8, 3) orthogonal codes are punctured. Then, the punctured (7, 3) codes repeat five times (that is, the punctured (7, 3) codes occur five consecutive times (the original punctured code plus four repetitions)) and three bold underlined columns of each fifth repeated codeword are punctured. As a result, codewords of length 32 are produced. A code resulting from puncturing all 0s-columns in a matrix of orthogonal codes is called a simplex code. In other words, the simplex code is a ($2^k$, k) orthogonal code (or a first order Reed-Muller code) with the first column having all 0s removed. Hence, the simplex code has length ($2^k-1$, k). Simplex codes include (3, 2) codes, (15, 4) codes, (31, 5) codes, (63, 6) codes, (127, 7) codes, and (255, 8) codes as well as the (7, 3) codes.

TABLE 4

| Input Bits | Codeword | | | | Hamming Distance |
|---|---|---|---|---|---|
| 000 | 0000000 | 0000000 | 0000000 | 0000000 | 0 |
| 001 | 1010101 | 1010101 | 1010101 | 1010101 | 4 × 4 + 2 = 18 |
| 010 | 0110011 | 0110011 | 0110011 | 0110011 | 4 × 4 + 2 = 18 |
| 011 | 1100110 | 1100110 | 1100110 | 1100110 | 4 × 4 + 2 = 18 |
| 100 | 0001111 | 0001111 | 0001111 | 0001111 | 4 × 4 + 4 = 20 |
| 101 | 1011010 | 1011010 | 1011010 | 1011010 | 4 × 4 + 2 = 18 |
| 110 | 0111100 | 0111100 | 0111100 | 0111100 | 4 × 4 + 2 = 18 |
| 111 | 1101001 | 1101001 | 1101001 | 1101001 | 4 × 4 + 2 = 18 |

As noted from Table 4, codes with a minimum distance of 18 can be formed by repeating the punctured (7, 3) codes. The Hamming distance distribution of the codewords varies according to the positions of the punctured symbol columns. The best performance is obtained by puncturing symbols at the positions shown in Table 4. As shown in Table 4, the first, second, and third columns of each fifth repeated codeword are punctured in the punctured (7, 3) codes. Since the codewords result from repetition of punctured (7, 3) codewords, the Hamming distance distribution is not changed if the first columns of any other repeated codewords are punctured instead of the first columns of the fifth repeated codewords. For example, when the $1^{st}(=7\times0+1)$, $16^{th}$ ($=7\times2+2$), and $31^{th}$ ($=7\times4+3$) columns are punctured, the above Hamming distance distribution results.

As stated before, the present invention pertains to a method of generating optimum codes by repeating simplex codes, punctured (7, 3) orthogonal codes and an optimum encoding/decoding apparatus for encoding/decoding information such as RRI bits in a CDMA system using the optimum code generation method. In the foregoing description three-bit RRI values are encoded using (7, 3) codes formed by puncturing columns with all 0s without any influence on Hamming distances in (8, 3) codes. Each (7, 3) code is repeated five times (each (7, 3) code occurs five consecutive times) to generate codewords of length 35 and three symbols of each particular codeword are punctured.

In reality, in the case of an (N, k) encoder with $N>2^k$, repeated codewords of orthogonal codes of length $2^k$ are undesirable in Hamming distance distribution because they have code symbols with 0s without influencing Hamming distances. Especially when $N>k\cdot2^k$, the (N, k) encoder outputs excellent codes in terms of minimum distance by repeating (7, 3) punctured orthogonal codes, rather than by repeating (8, 3) orthogonal codes. If the code length N is not a multiple of 7, code symbols should be punctured after repetition of the punctured (7, 3) orthogonal codes and performance varies depending on puncturing positions.

For example, if the remainder of dividing N by 7 is 1, optimum (N, 3) codes are produced by repeating code symbols N/7+1 times and then puncturing six different code symbols. If the remainder of dividing N by 7 is 2, optimum codes (N, 3) codes are produced by repeating code symbols N/7+1 times and then puncturing five different code symbols. If the remainder of dividing N by 7 is 5, optimum (N, 3) codes are produced by repeating code symbols N/7+1 times and then puncturing two different code symbols. If the remainder of dividing N by 7 is 6, optimum codes (N, 3) codes are produced by repeating code symbols N/7+1 times and then puncturing one code symbol.

On the other hand, if the remainder of dividing N by 7 is 3 or 4, puncturing positions are determined in the following way. For a remainder of 3, code symbols are repeated N/7+1 times and then 1 to 7 are expressed as binary numbers 001 to 111. Considering the seven binary numbers three-dimensional vectors with their digits used as coordinates, four elements other than three linearly independent elements are punctured, thereby obtaining optimum codes. For example, 1 (=001), 2 (=010), and 4 (=100) are linearly independent since the sum of each binary number in the binary scale is not 0. Code symbols at 3rd, 5th, 6th, and 7th positions other than the 1st, 2nd, and 4th positions are punctured. Consequently, optimum (N, 3) codes are achieved.

For the remainder of 4, the orthogonal codes are repeated N/7__ times and then 1 to 7 are expressed as binary numbers 001 to 111. Considering the seven binary numbers three-dimensional vectors with their digits used as coordinates, three elements other than three linearly independent elements and an element obtained by summing the three linearly independent elements by digits in the binary scale are punctured, thereby obtaining optimum codes. For example. 1 (=001) 2 (=010), and 4 (=100) are linearly independent since the sum of each binary number in the binary scale is not 0. Then, 7 (=111) is obtained by adding 1 (=001), 2 (=010), and 4 (=100) by digits on the binary scale. Code symbols at 3rd, 5th, and 6th positions other than the 1st, 2nd, 4th, and 7th positions are punctured. Consequently, optimum (N, 3) codes are achieved.

The above method is available only for the (7, 3) punctured codes, that is, simplex codes. If codewords of (N, 3) codes are arranged in a predetermined order, each column forms an orthogonal code with length $2^3$ (=8). Seven orthogonal codes have length $2^3$ and at least one code symbol of 1. The (N, 3) codes are (N−1) times repeated orthogonal codes, each orthogonal code having length $2^3$ and at least one code symbol of 1. Accordingly if N is 7 or greater, some of non-zero orthogonal codes occur at least twice. As certain orthogonal codes are used repeatedly, the codes become less optimum. Therefore, the punctured (7, 3) codes should be used to minimize repetition of specific codes within a given length and repeat the seven orthogonal codes the same number of times. Then, optimum (N, 3) codes can be generated by the above repetition and puncturing.

Meanwhile, no optimum codes can be obtained from either punctured (6, 3) codes or punctured (5, 3) codes by repetition and puncturing in any manner because only some of seven codes are repeated.

In the above, the method of generating optimum codes by repeating punctured (7, 3) orthogonal codes and an optimum encoding/decoding apparatus for encoding/decoding RRI bits in a CDMA system have been described. However, it is to be noted that the number of RRI bits is a mere exemplary application and information other than the RRI can be encoded according to the present invention. Assuming that a k-bit sequence is encoded and a codeword with length N>($2^k$−1) is output, the input information is encoded using an (r, k) simplex code and a sequence of code symbols of length r are generated. Here, r=($2^k$−1). The code symbol sequence occurs t consecutive times $$\left(t = \left\lfloor \frac{N}{r} \right\rfloor + 1\right).$$

Puncturing is performed A times on the t repeated symbols such that the resulting codes have length N. A (A=rt−N). Punctured Symbols may be distributed uniformly across the repeated code symbol sequences or confined to the $t^{th}$ repeated code symbol sequence.

Figure 1:
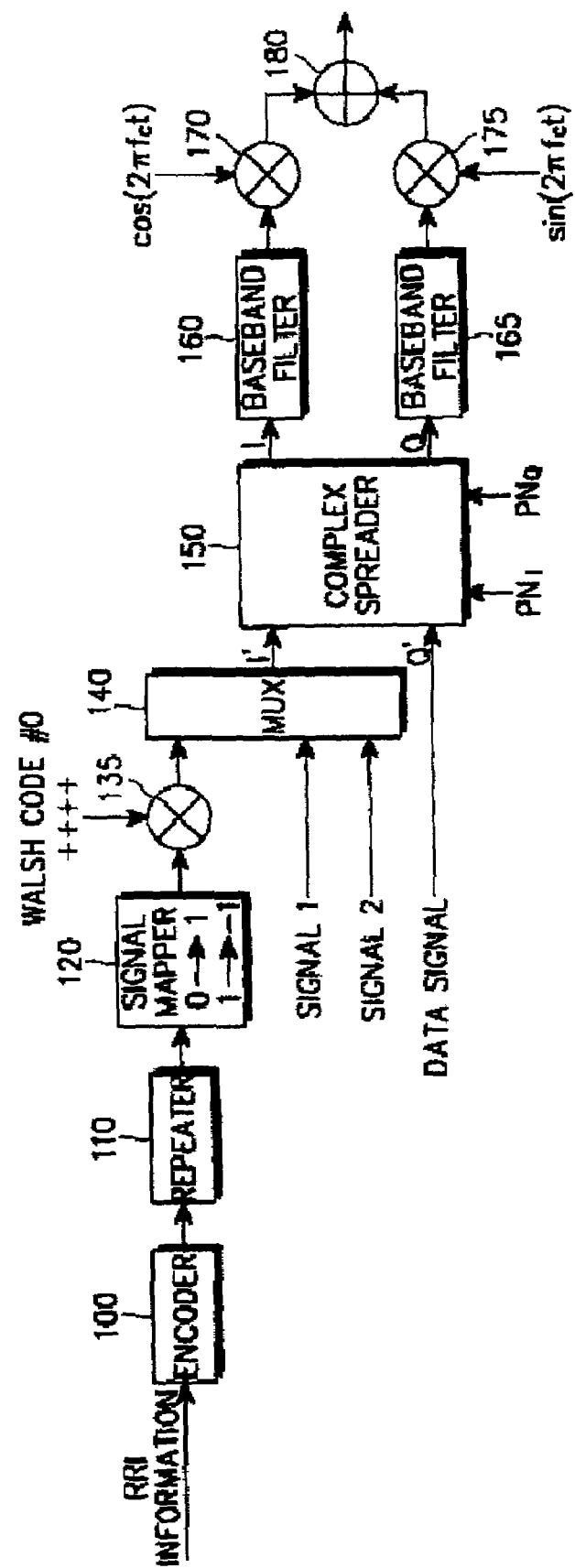
FIG. 1 is a block diagram of a transmitter for a mobile station in a conventional CDMA system.
Figure 2:
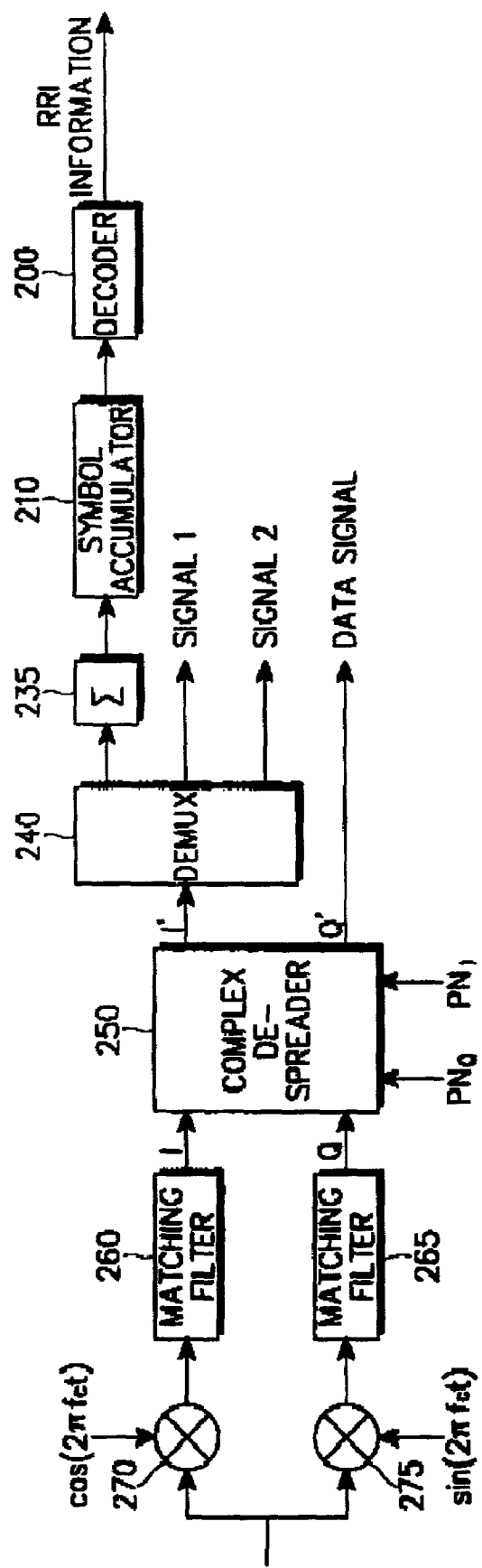
FIG. 2 is a block diagram of a receiver for a base station in the conventional CDMA system.
Figure 4:
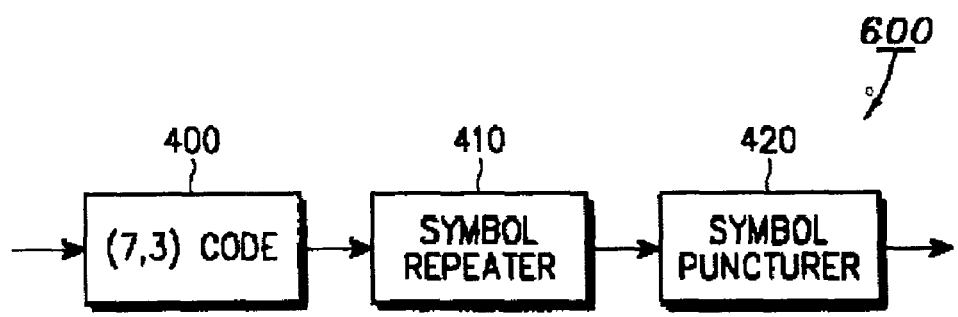
FIG. 4 is a block diagram of an encoding apparatus according to the present invention.
Figure 5:
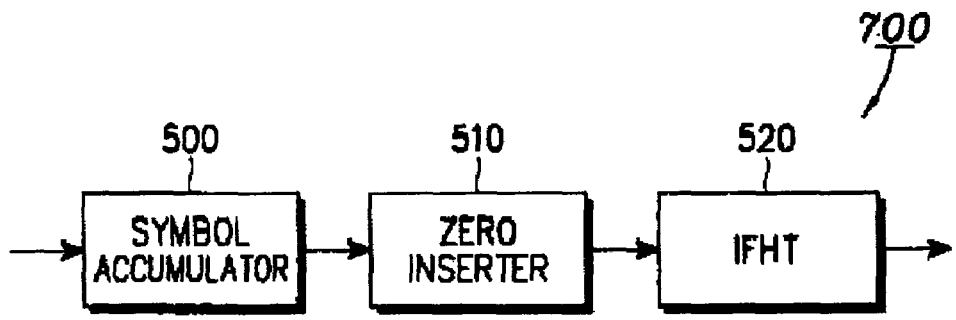
FIG. 5 is a block diagram of a decoding apparatus according to the present invention.
Figure 6:
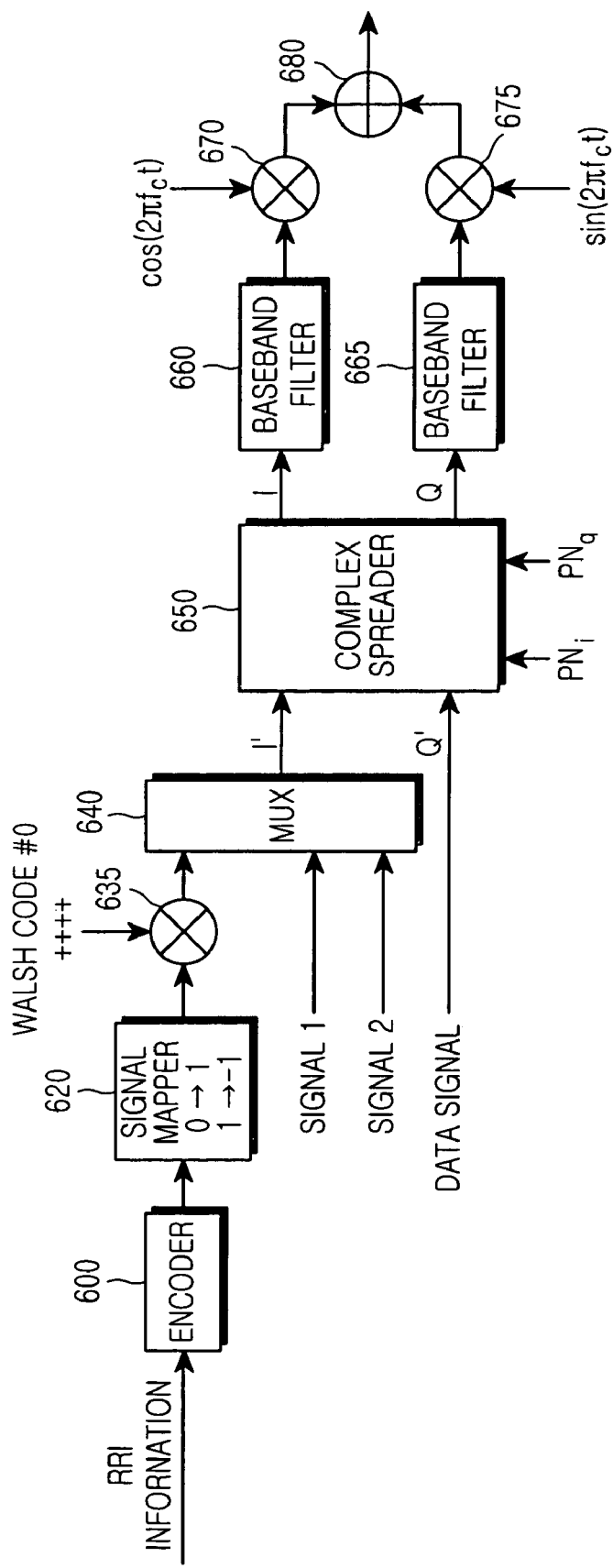
FIG. 6 is a block diagram of a transmitter for a mobile station in a CDMA system to which the present invention is applied.
Figure 7:
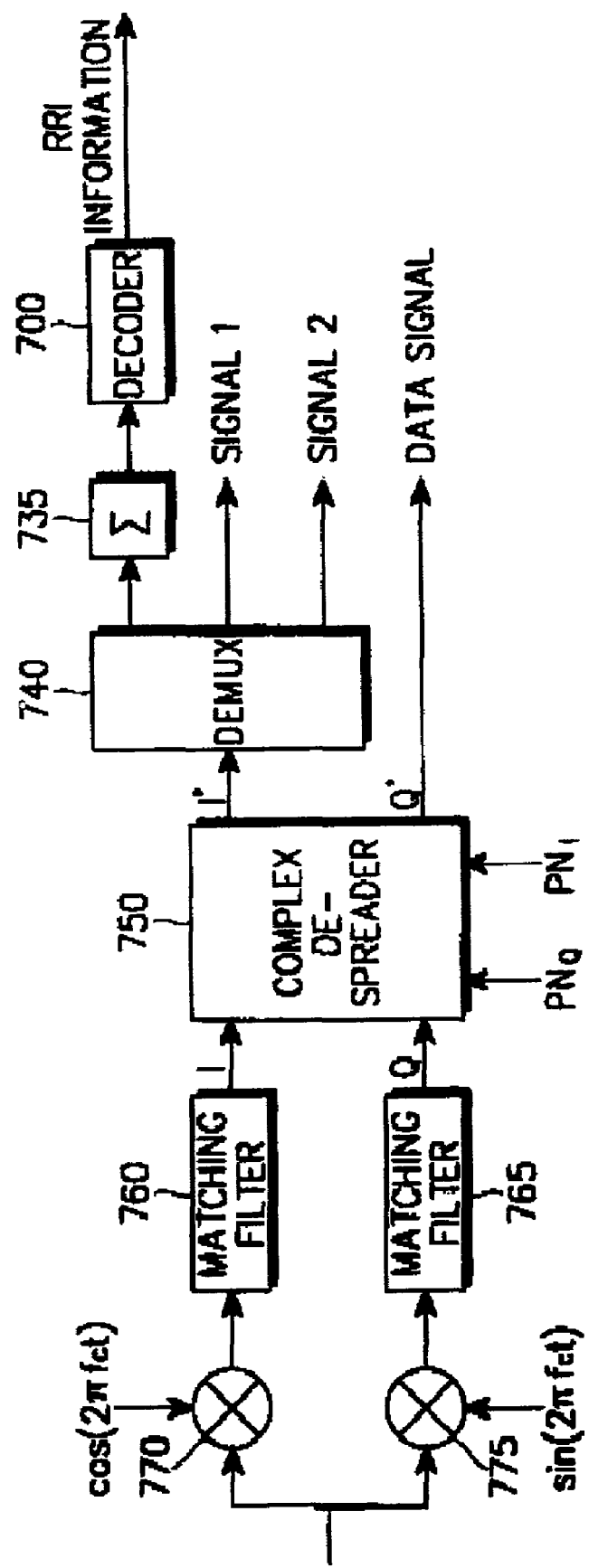
FIG. 7 is a block diagram of a receiver for a base station in the CDMA system to which the present invention is applied.

A description of embodiments of an RRI encoding apparatus and an RRI decoding apparatus in a CDMA system where RRI bits are transmitted according to the present invention will be given hereinbelow. FIGS. 4 and 5 are block diagrams of the RRI encoding apparatus and the RRI decoding apparatus, respectively according to the present invention. FIG. 6 is a block diagram of a transmitter with the encoding apparatus in a mobile station, which can be constituted by removing the repeater 110 from the transmitter shown in FIG. 1. FIG. 7 is a block diagram of a receiver with the decoding apparatus in a base station, which can be constituted by removing the symbol accumulator 210 from the receiver shown in FIG. 2. The encoding apparatus and the decoding apparatus are considered in two embodiments according to frame structures. The first embodiment is based on a frame structure wherein one transmission frame includes 16 slots (one transmission frame is 26.76 ms in duration) and the second embodiment is based on a frame structure wherein one transmission frame includes 12 slots (one transmission frame is 20 ms in duration).

First Embodiment

The first embodiment is applied to an HDR system wherein one transmission frame includes 16 slots, 16 code symbols are transmitted in one slot for RRI information, and a total of 256 (=16×16) symbols are transmitted in one frame. An optimum (256, 3) code generation method and an RRI encoding apparatus using optimum (256, 3) codes will be focused on in the first embodiment. More specifically, (256, 3) codes are generated by repeating punctured (7, 3) codes 37 times and puncturing part of the resulting 259 symbols (=7×37) at such positions to make a minimum distance optimum. The symbols at those positions, namely, symbols to be punctured, are the three bold underlined symbols, that is, the $1^{st}$, $128^{th}$, and $255^{th}$ symbols, shown in Table 5. The positions of symbols to be punctured are determined by n1×7+1, n2×7+2, and n3×7+3 (0≦n1. n2. n3≦36 and n1. n2. and n3 are the indexes of repeated blocks). In Table 5, puncturing positions #1, #128, and #255 are determined when n1=0, n2=18, and n3=36, respectively.

TABLE 5

| |
|---|
| 1 2 3 4 5 6 7 8 9 10 11 12 13 14 15 16 17 18 19 20 21 |
| 22 23 24 25 26 27 28 29 30 31 32 33 34 35 36 37 38 39 40 41 42 |
| 43 44 45 46 47 48 49 50 51 52 53 54 55 56 57 58 59 60 61 62 63 |
| 64 65 66 67 68 69 70 71 72 73 74 75 76 77 78 79 80 81 82 83 84 |
| 85 86 87 88 89 90 91 92 93 94 95 96 97 98 99 100 101 102 103 104 105 |
| 106 107 108 109 110 111 112 113 114 115 116 117 118 119 120 121 122 123 124 125 126 |
| 127 128 129 130 131 132 133 134 135 136 137 138 139 140 141 142 143 144 145 146 147 |
| 148 149 150 151 152 153 154 155 156 157 158 159 160 161 162 163 164 165 166 167 168 |
| 169 170 171 172 173 174 175 176 177 178 179 180 181 182 183 184 185 186 187 188 189 |
| 190 191 192 193 194 195 196 197 198 199 200 201 202 203 204 205 206 207 208 209 210 |
| 211 212 213 214 215 216 217 218 219 220 221 222 223 224 225 226 227 228 229 230 231 |
| 232 233 234 235 236 237 238 239 240 241 242 243 244 245 246 247 248 249 250 251 252 |
| 253 254 255 256 257 258 259 |

The (256, 3) codes become optimum codes with a minimum distance of 146 (=(4×36)+2) by puncturing the bold underlined symbols in Table 5.

The minimum distance is the same regardless of n1, n2, and n3 if symbols are punctured at the positions that satisfy the formula n1×7+1, n2×7+2, n3×7+3 (0≦n1, n2, n3≦36). If n1, n2, and n3 are 36 for simplicity of calculation, the first, second, and third symbols of seven symbols are punctured in the 37th repeated block after the (7, 3) codes are repeated 37 times. Here, since the minimum distance of the (7, 3) codes is 4 and the minimum distance in the 37th repeated block except for the first, second, and third symbols is 2, the minimum distance of the (256, 3) codes is 146 (=(4×36)+2).

These (256, 3) codes are optimum. An RRI encoding apparatus using the (256, 3) codes, a transmitter with the encoding apparatus, and a receiver being the counterpart of the transmitter will be described below.

It is assumed that three RRI information bits expressed in 0s and 1s are applied to the input of an encoder 600 in FIG. 6. According to the present invention, the encoder 600 is constituted as shown in FIG. 4.

Referring to FIG. 4, a codeword generator 400 encodes three RRI information bits with punctured (7, 3) orthogonal codes shown in Table 2 and outputs seven code symbols. A symbol repeater 410 repeats the code symbols 36 times and outputs 259 repeated code symbols. A symbol puncturer 420 punctures the 1st, $128^{th}$ ($=(7 \times 18)+2$), and $255^{th}$ ($=(7 \times 37)+3$) symbols of the 259 symbols and outputs 256 symbols. The 256 code symbols are input to a signal mapper 620 shown in FIG. 6.

Referring to FIG. 6, the signal mapper 620 converts 0s and 1s to 1s and −1s, respectively. A multiplier 635 multiplies the converted symbols by the converted chips (+1, +1, +1, +1) of Walsh code #0 of length 4 for spreading. A multiplexer 640 time-multiplexes the symbols received in chips from the multiplier 635 with other signals 1 and 2. The signals 1 and 2 can be DRC information. An output signal I' of the multiplexer 640 and a data signal Q' are input to a complex spreader 650. The complex spreader 650 complex-multiplies the signals I' and Q' by PN spreading codes PNI and PNQ. That is, the complex spreader 650 multiplies an input signal (I'+jQ') by a PN spreading code (PNI+JPNQ) and outputs a real component signal I and an imaginary component signal Q. Baseband filters 660 and 665 perform baseband filtering on the real component signal I and the imaginary component signal Q in a base band, respectively. Multipliers 670 and 675 multiply the filtered real component signal I and the filtered imaginary component signal Q received from the baseband filters 660 and 665 by carriers cos ($2\pi$fct) and sin ($2\pi$fct), respectively. A summer 680 sums the multiplication results and outputs the sum as a transmission signal.

FIG. 7 is a block diagram of a receiver for receiving the transmission signal from the transmitter including the encoding apparatus shown in FIG. 4.

Referring to FIG. 7, multipliers 770 and 775 multiply an input signal by cos ($2\pi$fct) and sin ($2\pi$fct), respectively. Matching filters 760 and 765 filter the multiplication results of the multipliers 770 and 775 and output matching-filtered signals I and Q. A complex despreader 750 despreads the signals I and Q to signals I' and Q'. A demultiplexer 740 time-demultiplexes the signal I' into other signals 1 and 2 and a signal for an RRI. An accumulator 735 accumulates the RRI signal on a 4-chip basis and outputs 256 symbols. A decoder 700 being the counterpart of the encoder 600 shown in FIG. 6 decodes the symbols received from the accumulator 735.

FIG. 5 is a block diagram of a decoding apparatus used as the decoder 700 for the receiver in a base station shown in FIG. 7 according to the present invention.

Referring to FIG. 5, for the input of 256 symbols, a symbol accumulator 500 as the counterpart of the symbol repeater 410 and the symbol puncturer 420 shown in FIG. 4 outputs 7 symbols. A zero inserter 510 inserts 0 before the 7 symbols and outputs 8 symbols in the form of Walsh codes. For example, if 7 symbols c1, c2, c3, c4, c5, c6, c7 are applied to the input of the zero inserter 510, 0 is added before the symbol sequence and 8 symbols, 0, c1, c2, c3, c4, c5, c6, c7 are output. An IFHT (Inverse Fast Hadamard Transformer) 520 decodes the eight symbols by inverse fast Hadamard transform and outputs decoded bits.

Second Embodiment

The second embodiment is applied to an HDR system wherein one transmission frame includes 12 slots. 16 code symbols are transmitted in one slot for RRI information, and a total of 192 ($=12 \times 16$) symbols are transmitted in one frame. An optimum (192, 3) code generation method and an RRI encoding apparatus using optimum (192, 3) codes will be focused on in the second embodiment. More specifically, (192, 3) codes are generated by repeating (7, 3) punctured codes 28 times and puncturing part of the resulting 196 symbols ($=7 \times 28$) at such positions to make a minimum distance optimum. The symbols at those positions, namely, symbols to be punctured, are the four bold underlined symbols, the $3^{rd}$, $54^{th}$, $104^{th}$, and $154^{th}$ symbols shown in Table 6. The positions of symbols to be punctured are determined by n1×7+3, n2×7+5, n3×7+6, and n4×7+7 ($0 \leq$ n1, n2, n3, n4 $\leq$ 27 and n1, n2, n3, and n4 are the indexes of repeated blocks). In Table 6, puncturing positions #3, #54, #104, and #154 are determined when n1=0, n2=7, n3=14, and n4=21, respectively.

TABLE 6

1 2 3 4 5 6 7 8 9 10 11 12 13 14
15 16 17 18 19 20 21 22 23 24 25 26 27 28
29 30 31 32 33 34 35 36 37 38 39 40 41 42
43 44 45 46 47 48 49 50 51 52 53 54 55 56
57 58 59 60 61 62 63 64 65 66 67 68 69 70
71 72 73 74 75 76 77 78 79 80 81 82 83 84
85 86 87 88 89 90 91 92 93 94 95 96 97 98
99 100 101 102 103 104 105 106 107 108 109 110 111 112
113 114 115 116 117 118 119 120 121 122 123 124 125 126
127 128 129 130 131 132 133 134 135 136 137 138 139 140
141 142 143 144 145 146 147 148 149 150 151 152 153 154
155 156 157 158 159 160 161 162 163 164 165 166 167 168
169 170 171 172 173 174 175 176 177 178 179 180 181 182
183 184 185 186 187 188 189 190 191 192 193 194 195 196

The punctured symbols have the same minimum distance regardless of n1, n2, n3, and n4 in the formula by n1×7+3, n2×7+5, n3×7+6, and n4×7+7 ($0 \leq$ n1, n2, n3, n4 $\leq$ 2.7). If n1, n2, n3, and n4 are 27 for simplicity of calculation, the third, fifth, sixth, and seventh symbols of 7 symbols are punctured in the 27th repeated block after the (7, 3) codes are repeated 27 times. Here, since the minimum distance of the (7, 3) codes is 4 and the minimum distance between symbols in the 27th repeated block except for the third, fifth, sixth, and seventh symbols is 1, the minimum distance of the (192, 3) codes is 109 ($=(4\times 27)+1$). These (192, 3) codes are optimum. An RRI encoding apparatus using the (192, 3) codes, a transmitter with the encoding apparatus, and a receiver being the counterpart of the transmitter will be described below.

It is assumed that three RRI information bits expressed in 0s and 1s are applied to the input of the encoder 600 in FIG. 6. According to the present invention, the encoder 600 is constituted as shown in FIG. 4.

Referring to FIG. 4, the codeword generator 400 encodes three RRI information bits with punctured (7, 3) orthogonal codes shown in Table 2 and outputs seven code symbols. The symbol repeater 410 repeats the code symbols 27 times and outputs 196 repeated code symbols. The symbol puncturer 420 punctures the $3^{rd}$($=(7\times 0)+3$), $54^{th}$ ($=(7\times 7)+5$), $104^{th}$ ($=(7\times 14)+6$), and $154^{th}$ ($=(7\times 21)+7$) symbols of the 196 symbols and outputs 192 symbols. The 192 code symbols are input to the signal mapper 620 shown in FIG. 6.

Referring to FIG. 6, the signal mapper 620 converts 0s and 1s to 1s and −1s, respectively. The multiplier 635 multiplies the converted symbols by the converted chips (+1, +1, +1, +1) of Walsh code #0 of length 4 for spreading. The multiplexer 640 time-multiplexes the symbols received in chips from the multiplier 635 with other signals 1 and 2. The signals 1 and 2 can be DRC information. An output signal I' of the multiplexer 640 and a data signal Q' are input to the complex spreader 650. The complex spreader 650 complex-multiplies the signals I' and Q' by PN spreading codes PNI and PNQ. That is, the complex spreader 650 multiplies an input signal (I'+jQ') by a PN spreading code (PNI+jPNQ) and outputs a real component signal I and an imaginary component signal Q. The baseband filters 660 and 665 perform baseband filtering on the real component signal I and the imaginary component signal Q in a base band, respectively. The multipliers 670 and 675 multiply the filtered real component signal I and the filtered imaginary component signal Q by carriers cos (2πfct) and sin (2πfct), respectively. The summer 680 sums the multiplication results and outputs the sum as a transmission signal.

FIG. 7 is a block diagram of a receiver for receiving the transmission signal from the transmitter including the encoding apparatus shown in FIG. 4.

Referring to FIG. 7, the multipliers 770 and 775 multiply an input signal by cos (2πfct) and sin (2πfct), respectively. The matching filters 760 and 765 filter the multiplication results of the multipliers 770 and 775 and output matching-filtered signals I and Q. The complex despreader 750 despreads the signals I and Q to signals I' and Q'. The demultiplexer 740 time-demultiplexes the signal I' into other signals 1 and 2 and a signal for an RRI. The accumulator 735 accumulates the RRI signal on a 4-chip basis and outputs 192 symbols. The decoder 700 decodes symbols received from the accumulator 735 as the counterpart of the encoder 600 shown in FIG. 6.

FIG. 5 is a block diagram of a decoding apparatus used as the decoder 700 for the receiver in a base station shown in FIG. 7 according to the present invention.

Referring to FIG. 5, for the input of 192 symbols, the symbol accumulator 500 as the counterpart of the symbol repeater 410 and the symbol puncturer 420 shown in FIG. 4 outputs seven symbols. The zero inserter 510 inserts 0 before the 7 symbols and outputs 8 symbols in the form of Walsh codes. For example, if 7 symbols c1, c2, c3, c4, c5, c6, c7 are applied to the input of the zero inserter 510, 0 is added before the symbol sequence and 8 symbols, 0, c1, c2, c3, c4, c5, c6, c7 are output. The IFHT 520 decodes the eight symbols by inverse fast Hadamard transform and outputs decoded bits.

As described above, the present invention can increase performance by maximizing a minimum distance that determines the performance of an error correction encoder in encoding information like an RRI indicating the data rate of transmission frames in a CDMA communication system.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A method of encoding input information of k-bits and generating a codeword with length $N>(2^k-1)$ in a mobile communication system, comprising the steps of:

encoding the input information using a (r, k) simplex code and generating a sequence of code symbols of length r, where $r=2^k-1$;

repeating the sequence of code symbols t times, where $$\left(t = \left\lfloor \frac{N}{r} \right\rfloor + 1\right);$$

and puncturing A times on the t repeated code symbol sequences so that the resulting codes have length N, where A=rt−N, wherein the puncturing is performed in a same position of each sequence with the length N.

2. The method of claim 1, wherein the punctured symbols are distributed uniformly across the repeated code symbol sequences.

3. The method of claim 1, wherein the punctured symbols are confined to the $t^{th}$ repeated code symbol sequence.

4. The method of claim 1, wherein the k-bits sequence is information indicating a data rate of a mobile station.

5. An apparatus for encoding input information of k-bits sequence and generating a codeword with length $N>(2^k-1)$, comprising:

an encoder for encoding the input information using an (r, k) simplex code and generating a sequence of code symbols of length r, where $r=2^k-1$;

a repeater for repeating the sequence of code symbols t times, where $$\left(t = \left\lfloor \frac{N}{r} \right\rfloor + 1\right);$$

and a puncturer for puncturing A times on the t repeated code symbol sequences so that the resulting codes have length N, where A=rt−N, wherein the puncturing is performed in a same position of each sequence with the length N.

6. The apparatus of claim 5, wherein the punctured symbols are distributed uniformly across the repeated code symbol sequences.

7. The apparatus of claim 5, wherein the punctured symbols are confined to the $t^{th}$ repeated code symbol sequence.

8. The apparatus of claim 5, wherein the k-bits sequence is information indicating a data rate of a mobile station.

9. An encoding method in a mobile communication system comprising the steps of:

encoding input information using a (7, 3) simplex code and generating a sequence of code symbols of length 7;

repeating the sequence of code symbols t times, where $$t = \left\lfloor \frac{N}{7} \right\rfloor + 1,$$

where N>7; and performing puncturing A times, where A=7t−N, on the t repeated code symbol sequences in a predetermined puncturing pattern so that the resulting codes have length N that is not a multiple of 7, wherein the puncturing is performed in a same position of each sequence with the length N.

10. The encoding method of claim 9, wherein if the remainder of dividing the N by 7 is 1, the predetermined puncturing pattern is set to puncture six arbitrary symbols.

11. The encoding method of claim 9, wherein if the remainder of dividing the N by 7 is 2, the predetermined puncturing pattern is set to puncture five arbitrary symbols.

12. The encoding method of claim 9, wherein if the remainder of dividing the N by 7 is 3, the predetermined puncturing pattern is set to puncture the third, fifth, sixth, and seventh symbols of the $t^{th}$ repeated code symbol sequence.

13. The encoding method of claim 9, wherein if the remainder of dividing the N by 7 is 4, the predetermined puncturing pattern is set to puncture the third, fifth, and sixth symbols of the $t^{th}$ repeated code symbol sequence.

14. The encoding method of claim 9, wherein if the remainder of dividing the N by 7 is 5, the predetermined puncturing pattern is set to puncture two arbitrary symbols.

15. The encoding method of claim 9, wherein if the remainder of dividing the N by 7 is 6, the predetermined puncturing pattern is set to puncture one arbitrary symbol.

16. The encoding method of claim 9, wherein if the remainder of dividing the N by 7 is 3, the predetermined puncturing pattern is set to puncture the $(n1 \times 7+3)^{th}$, $(n2 \times 7+5)^{th}$, $(n3 \times 7+6)^{th}$, and $(n4 \times 7+7)^{th}$ symbols of the repeated code symbols ($0 \leq n1, n2, n3, n4 \leq (t-1)$).

17. The encoding method of claim 9, wherein if the remainder of dividing the N by 7 is 4, the predetermined puncturing pattern is set to puncture the $(n1 \times 7+1)^{th}$, $(n2 \times 7+2)_{th}$, and $(n3 \times 7+3)^{th}$ symbols of the repeated code symbols ($0 \leq n1, n2, n3 \leq (t-1)$).

18. The encoding method of claim 9, wherein the input information indicates a data rate of a mobile station.

* * * * *